United States Patent
Lecoffre et al.

(10) Patent No.: US 9,731,223 B2
(45) Date of Patent: Aug. 15, 2017

(54) DEVICE FOR SEPARATING TWO IMMISCIBLE FLUIDS OF DIFFERENT DENSITIES BY CENTRIFUGATION

(71) Applicant: YLEC CONSULTANTS, La Tronche (FR)

(72) Inventors: Yves Lecoffre, Grenoble (FR); Guillaume Maj, Saint Martin d'Heres (FR)

(73) Assignee: YLEC CONSULTANTS, La Tronche (FR)

( * ) Notice: Subject to any disclaimer, the term of this patent is extended or adjusted under 35 U.S.C. 154(b) by 513 days.

(21) Appl. No.: 14/350,181

(22) PCT Filed: Feb. 1, 2013

(86) PCT No.: PCT/EP2013/052089
§ 371 (c)(1),
(2) Date: Apr. 7, 2014

(87) PCT Pub. No.: WO2013/113903
PCT Pub. Date: Aug. 8, 2013

(65) Prior Publication Data
US 2014/0251145 A1    Sep. 11, 2014

(30) Foreign Application Priority Data

Feb. 2, 2012  (FR) ..................... 12 50983

(51) Int. Cl.
*B01D 17/038* (2006.01)
*B01D 17/02* (2006.01)
*B01D 19/00* (2006.01)

(52) U.S. Cl.
CPC ..... *B01D 17/0217* (2013.01); *B01D 19/0052* (2013.01)

(58) Field of Classification Search
CPC .... B04B 1/04; B04B 1/06; B04B 1/10; B04B 1/12; B04B 5/12; B04B 2005/125;
(Continued)

(56) References Cited

U.S. PATENT DOCUMENTS 3,332,614 A * 7/1967 Webster .................... B04B 5/06
494/22
3,780,937 A * 12/1973 Tahara ...................... B04B 9/02
494/25
(Continued)

FOREIGN PATENT DOCUMENTS

WO    93/25294    12/1993
WO    95/26223    10/1995
(Continued)

OTHER PUBLICATIONS

International Search Report dated Jun. 18, 2013, corresponding to PCT/EP2013/052089.

*Primary Examiner* — David C Mellon
(74) *Attorney, Agent, or Firm* — Young & Thompson

(57) ABSTRACT

A device for separating immiscible fluids of different densities from a liquid-containing emulsion, includes a longitudinal rotary drum having a longitudinal axis of rotation. The drum includes, longitudinally from upstream to downstream and between at least one upstream inlet and downstream outlets: a solid body rotation stage having an inlet and including at least one longitudinal inner partition for causing circumferential solid body rotation; a migration and coalescence stage including at least one longitudinal partition for causing circumferential solid body rotation, the partition delimiting at least one longitudinal channel communicating with the solid body rotation stage; and an extraction stage including at least one liquid outlet that has an overflow edge and extends along a longitudinal flow space communicating with the migration and coalescence (Continued)

stage via at least one longitudinal passage, and including a downstream liquid discharge space communicating with the outlet and connected to a downstream discharge port.

26 Claims, 11 Drawing Sheets

(58) Field of Classification Search
CPC .... B04B 7/08; B04B 7/12; B04B 7/18; B04B 9/02; B04B 11/06; B01D 17/0217; B01D 17/041; B01D 19/0052
See application file for complete search history.

(56) References Cited

U.S. PATENT DOCUMENTS

| | | | |
|---|---|---|---|
| 3,810,347 A | 5/1974 | Kartinen | |
| 5,254,076 A * | 10/1993 | Chow ................ | B01D 11/0476 210/787 |
| 5,352,343 A * | 10/1994 | Bailes ................ | B01D 17/0217 204/164 |
| 5,387,342 A * | 2/1995 | Rogers ............... | B01D 17/0217 210/360.1 |
| 5,571,070 A * | 11/1996 | Meikrantz ................ | B04B 1/02 366/305 |
| 8,062,400 B2 * | 11/2011 | Maier ................ | B01D 17/0217 210/360.1 |
| 2008/0173592 A1 * | 7/2008 | Patel ........................ | B04B 1/00 210/787 |

FOREIGN PATENT DOCUMENTS

| WO | 2012/009158 | 1/2012 |
|---|---|---|
| WO | 2012/009159 | 1/2012 |

\* cited by examiner

DEVICE FOR SEPARATING TWO IMMISCIBLE FLUIDS OF DIFFERENT DENSITIES BY CENTRIFUGATION

BACKGROUND OF THE INVENTION

Field of the Invention

The present invention relates to the area of the separation of immiscible fluids of different densities.

It may be applied in particular to problems concerning the separation of oil and water in crude oil emulsions, whether in the area of petroleum production, refining or decontamination. It may likewise find an application in the separation of greases in the environment, in the extraction of free gases in one or more liquids, in the treatment of rainwater or in the production of olive oil. In particular, it may find an application in the separation of the phases of an emulsion comprising a majority fluid, referred to as a carrier fluid, in which droplets of a secondary fluid are present.

Description of the Related Art

In order to carry out this operation, the use of gravity separators is well known, into which the emulsion is introduced at one extremity of a reservoir such that, after a sufficient residence time, the drops of the secondary fluid of the emulsion increase or decrease depending on whether their density is lower or higher than that of the carrier fluid. Two superimposed layers of the two fluids are thus created at the extremity of the reservoir, the lighter fluid being above and the heavier fluid being below, which fluids are pumped by appropriate means.

Gravity separators suffer from the major shortcoming that they require very long separation periods. It has been estimated that a period of 5 minutes is required, for example, in order for a drop of oil having a diameter equivalent to 200 micrometers, having a density of 0.85, to rise to a height of 1 m in still, fresh water at a temperature of 20°. Furthermore, gravity separators are bulky, heavy and expensive. As a result, they are incapable of being moved or transported on lightweight and rapid platforms, such as hovercrafts, whose use is particularly well suited to the treatment of oil spillages in zones which are not readily accessible, such as wetlands.

The use of rotary separators with a centrifugal effect, which allow much shorter separation periods than those of gravity separators to be achieved, such as fixed cyclones, rotary cyclones and centrifuges, is also well known. In the current embodiments, these rotary separators are generally complex in nature and are also very heavy, bulky and very expensive. Furthermore, they do not lend themselves readily to being moved or transported.

A separator with a centrifugal effect is described in particular in the patent published under the reference number WO95/26223. This separator comprises a rotating drum defining a compartment exhibiting an axial inlet for an emulsion at one extremity, and inside which there are arranged, for a first length, radially extending longitudinal paddles, followed, for a second length, by a porous cylindrical coalescence body formed by rolled coils of mesh or layers of mesh. This drum comprises, downstream of this compartment, annular overflows intended for the extraction of the liquids, separately, and axial passageways intended for the discharge of the separated liquids. This separator exhibits, in particular, the disadvantages of being very limited in respect of the ratios between the densities of the liquids in the emulsion to be treated and the volumetric ratios of the liquids in the emulsion to be treated, and of becoming clogged rapidly.

Another separator with a centrifugal effect is likewise described in the patent published under the reference number WO 93/25294. This separator comprises a rotating drum of truncated conical form defining a compartment exhibiting an axial inlet for an emulsion at its smallest extremity, and comprises, downstream of this compartment, annular overflows intended for the extraction of the liquids, separately, and axial passageways intended for the discharge of the separated liquids. Arranged in a first section of said compartment, far away from its downstream extremity, are radially extending longitudinal paddles, the stated purpose of which is to permit an axial alignment of the emulsion. However, these vanes exhibit the disadvantage of generating a considerable shear effect during rotation of the drum and circumferential percussion of the emulsion, contrary to the desired object of the separation of the liquid.

SUMMARY OF THE INVENTION

The object of the present invention is to improve separators with a centrifugal effect.

A device for separating immiscible fluids of different densities from an emulsion containing at least one liquid, comprising a longitudinal rotary drum having a longitudinal axis of rotation is proposed.

The drum comprises, internally, longitudinally from upstream to downstream and between at least one upstream inlet and a number of downstream outlets, a solid body rotation stage, a migration and coalescence stage and an extraction stage.

The solid body rotation stage comprises at least one chamber, inside which is arranged at least one longitudinal inner partition for causing circumferential solid body rotation delimiting at least one flow space communicating with said inlet.

The migration and coalescence stage comprises at least one chamber, inside which is arranged at least one longitudinal interior partition for causing circumferential solid body rotation, delimiting a plurality of longitudinal flow channels exhibiting respectively one upstream extremity communicating with said flow space of said solid body rotation stage and one downstream extremity connected to said outlets, said partition comprising at least one longitudinal partition delimiting at least one of said longitudinal channels and extending as far as said downstream extremity.

The extraction stage comprises at least one liquid overflow comprising an overflow edge turned facing towards said axis of rotation and extending along a longitudinal flow space communicating, upstream, with said longitudinal channels of the migration and coalescence stage via at least one longitudinal passageway, and comprising, downstream, a downstream liquid discharge space communicating with the longitudinal flow space and connected to one of said downstream outlets.

The upstream inlet may discharge into a section of said flow space of the solid body rotation stage situated close to the axis of rotation.

The device may comprise an axial pipe or an axial tube that is integral with the drum for the purpose of conveying the emulsion into the central section of the chamber of the solid body rotation stage.

The partitioning of the migration and coalition stage may define, from upstream to downstream, a plurality of circumferentially distributed longitudinal channels.

The partitioning of the migration and coalition stage may define, from upstream to downstream, an intermediate plurality of circumferentially and radially distributed longitudinal channels, followed by a downstream plurality of circumferentially distributed longitudinal channels, of which each channel communicates with a number of the channels in the first plurality of channels.

The partitioning of the migration and coalition stage may define, from upstream to downstream, an upstream plurality of circumferentially distributed longitudinal channels, followed by an intermediate plurality of circumferentially and radially distributed longitudinal channels, of which a number of channels communicate with each channel in the upstream plurality of channels, followed by a downstream plurality of circumferentially distributed longitudinal channels, of which each channel communicates with a number of the channels in the first plurality of channels.

The extraction stage may comprise an overflow, of which the overflow edge is annular, and an annular downstream liquid discharge space communicating with a downstream peripheral outlet.

The extraction stage may comprise an overflow, of which the overflow edge is close to the axis of rotation, the downstream liquid discharge space of this overflow being connected to a downstream liquid outlet and to a downstream gas outlet.

The device may comprise partitions for causing circumferential rotation positioned inside the downstream liquid flow space.

Circumferentially driving vanes may be positioned inside the longitudinal flow space.

The extraction stage comprises an interior overflow for lighter liquid, of which the longitudinal flow space communicates with the migration and coalescence stage via a longitudinal interior passageway, and an exterior overflow for a heavier liquid, of which the longitudinal flow space communicates with the migration and coalescence stage via a longitudinal exterior passageway located further from said axis of rotation than the longitudinal interior passageway.

The overflow edge of the exterior overflow may be located further away from said axis of rotation than the overflow edge of the interior overflow.

The overflow edge of the exterior overflow may be situated, in the radial sense, between the exterior longitudinal passageway and the overflow edge of the interior overflow.

The interior overflow and the exterior overflow may be connected to different downstream outlets by means of different downstream discharge spaces.

Circumferentially driving vanes may be positioned inside the intermediate flow space connecting the exterior passageway and the exterior overflow.

Said circumferentially driving vanes may exhibit an interior edge situated outside and at a distance from the overflow edge of the exterior overflow.

Circumferentially driving vanes may be positioned inside the longitudinal flow space of the interior overflow.

Circumferentially driving vanes may be positioned inside the downstream discharge space of the interior overflow.

Circumferentially driving vanes may be positioned inside the downstream discharge space of the exterior overflow.

The device may comprise a support for said drum, exhibiting a section provided with outlet pipes, at least one of said outlet pipes communicating with a downstream outlet for liquid from said drum.

The device may comprise a rotating fluid seal formed between the drum and the support, adjoining the extraction stage, said rotating seal comprising two fixed radial walls that are integral with the support and delimit a space that is open in the radial sense towards the interior and a rotating radial wall that is integral with the drum engaged at a distance between said fixed radial rings, said open space being connected to the chamber of the migration and coalition stage, the rotating radial wall being provided on both sides with circumferentially driving vanes.

The drum may be equipped with a radial interior wall separating the chamber of the solid body rotation stage and the chamber of the migration and coalescence stage, said radial interior wall being provided with through passageways.

The drum may be equipped with a radial interior wall separating the chamber of the migration and coalescence stage and the extraction stage, said radial interior wall exhibiting at least one longitudinal communication passageway between these stages.

The device may comprise a pipe connecting the internal space of the interior overflow and the internal space of the exterior overflow.

The device may comprise a pipe for connecting the internal space of the interior overflow to the exterior and a pipe for connecting the internal space of the exterior overflow to the exterior.

The device may comprise gas pressurization/depressurization sources that are connected to the flow spaces of the overflows of the extraction stage, in such a way that these pressures act respectively on the free surfaces of the liquids.

The extraction stage may be situated above the migration and coalescence stage.

The device may likewise comprise an inlet chamber connected axially to the central section of the chamber of the solid body rotation stage, said inlet chamber being supplied tangentially in the direction of rotation of said drum in order to bring about a rotation of the emulsion as far as the solid body rotation stage.

Likewise proposed is a device for separating immiscible fluids of different densities from an emulsion containing at least two liquids, comprising a longitudinal rotary drum having a longitudinal axis of rotation, and in which the drum comprises, longitudinally from upstream to downstream and between at least one upstream inlet and a number of downstream outlets:

a migration and coalescence stage for the liquids;

and an extraction stage comprising one interior overflow for lighter liquid, of which the longitudinal flow space communicates with the migration and coalescence stage via an interior longitudinal passageway, and one external overflow for a heavier liquid, of which the longitudinal flow space communicates with the migration and coalescence stage via an exterior longitudinal passageway situated further away from said axis of rotation than the interior longitudinal passageway.

The above device may comprise at least one gas pressurization/depressurization source that is capable of adjustment or regulation and is connected to at least one of the flow spaces of the overflows of the extraction stage, in such a way that the supplied pressure acts on the free surface of the corresponding liquid.

The device may also comprise two gas pressurization/depressurization sources that are capable of adjustment or regulation and are connected respectively to the flow spaces of the overflows of the extraction stage, in such a way that the supplied pressures act respectively on the free surfaces of the corresponding liquids.

BRIEF DESCRIPTION OF THE DRAWING FIGURES

Devices for separating fluids from an emulsion containing at least one fluid and their operating modes are now described in a non-restrictive manner with reference to the drawings, in which.

DETAILED DESCRIPTION OF THE INVENTION

Figure 1:
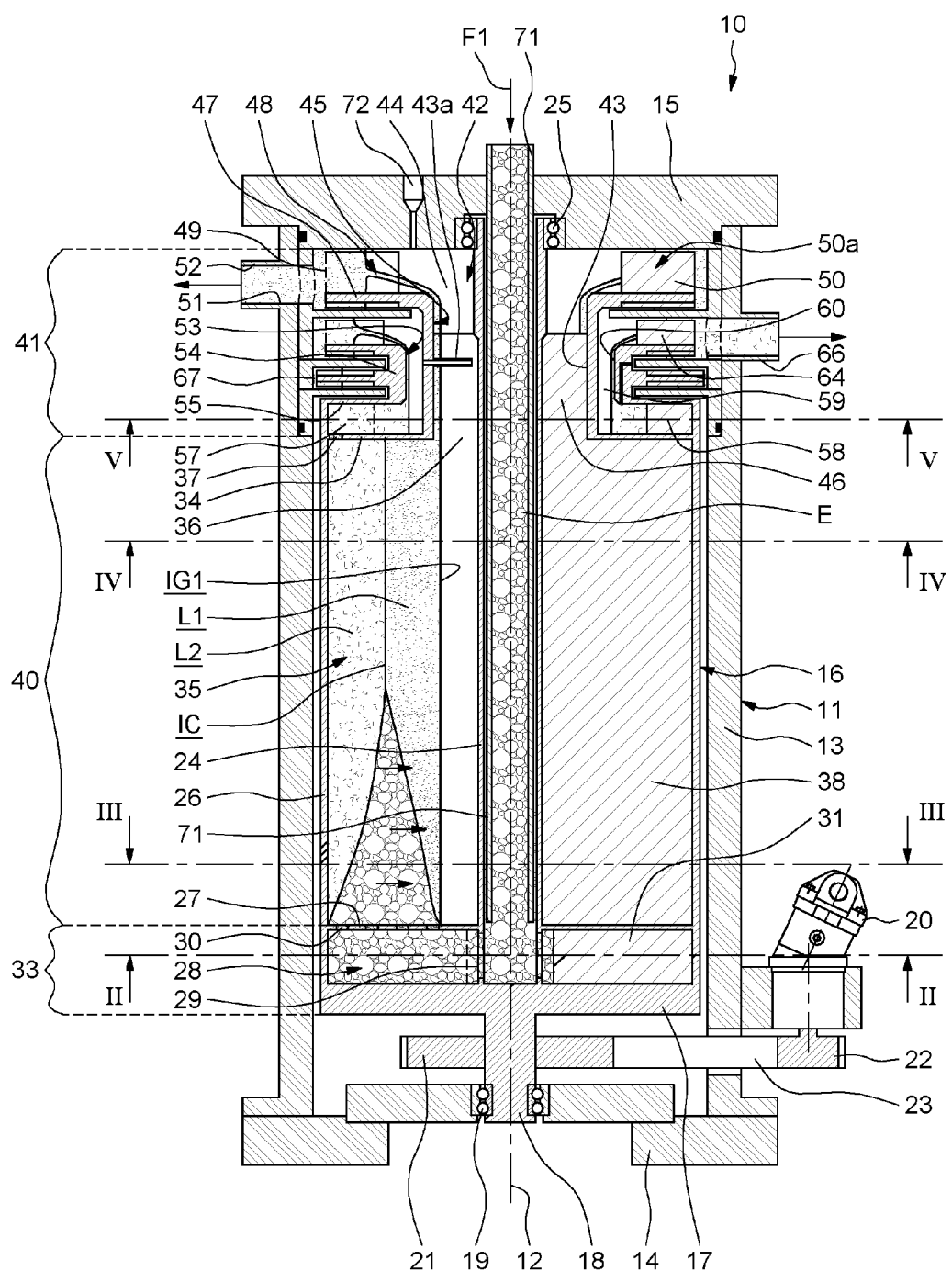
FIG. 1 represents a vertical cross section through a device for separating two liquids from an emulsion, in two offset planes identified angularly in FIG. 2 by the reference I-I, the axis of the separation device being positioned vertically.

First, it is necessary to define what the expression "liquid driven circumferentially in solid body rotation" is intended to denote in the following description. A liquid is said to be "driven circumferentially in solid body rotation" when it is contained inside a compartment, which is decentered in relation to an axis of rotation and which extends over a limited angular sector, between partitions that are spaced circumferentially, such that the compartment rotates about the axis of rotation and the liquid is accordingly subjected to the effects of the centrifugal force.

A separation device 10 illustrated in FIGS. 1 to 6 comprises a fixed support 11 having a vertical axis 12, which comprises a cylindrical peripheral wall or a ferrule 13, a lower radial wall 14 and an upper radial cover 15.

Arranged inside the support 11 is a rotating drum 16 rotating about the vertical axis 12. This drum 16 comprises a lower radial wall 17, in the form of a disc, situated at a distance above the lower radial wall 14 and provided towards its bottom with a section of an axial cylindrical shaft 18 engaged in the lower radial wall 14 and supported on the latter by means of a rotating supporting bearing 19 of the drum 16.

The drum 16 is caused to rotate by a drive motor 20 by a means of connection which comprises, for example, a pulley 21 carried by the cylindrical shaft 18, a pulley 22 carried by the shaft of the motor 20 and a belt 23 connecting these pulleys.

The drum 16 comprises an interior axial cylindrical tube 24, having a small diameter, of which the lower extremity is integral with the lower radial wall 17, and of which the upper extremity is engaged in the radial cover 15 and is mounted on this cover by means of a rotating supporting bearing 25 of the drum 16.

The drum 16 comprises an axial cylindrical peripheral wall 26 situated internally at a short distance from the ferrule 13, the lower extremity of which is integral with the periphery of the lower radial wall 17, and the upper extremity of which is situated at a distance below the radial cover 15.

The drum 16 comprises an intermediate interior radial wall 27, of annular form, which is situated to the side of and at a distance from the lower radial wall 17, and which connects together the interior cylindrical tube 24 and the cylindrical peripheral wall 26. The lower radial wall 17 and the intermediate radial wall 27 between them form an inlet chamber 28.

Figure 2:
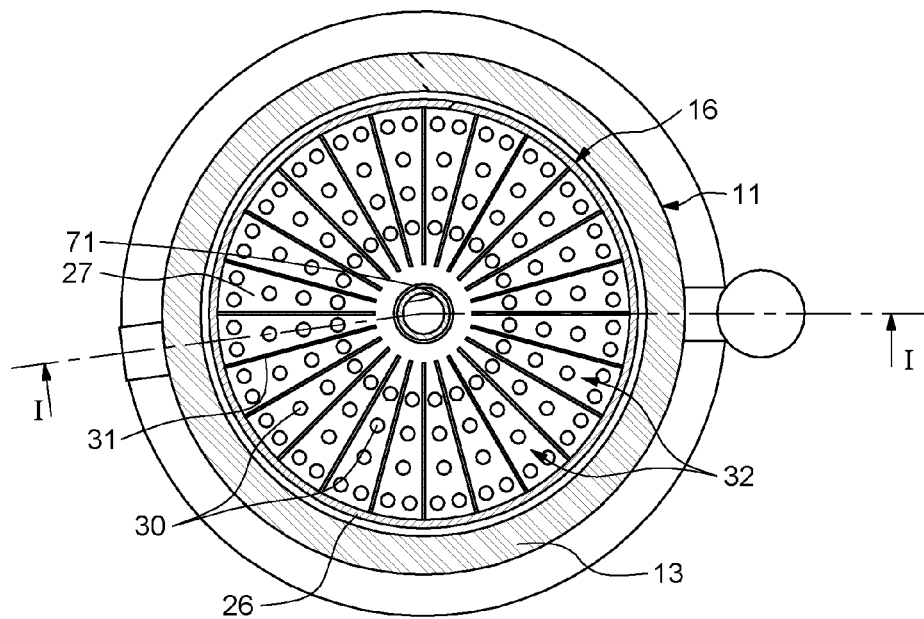
FIG. 2 represents a radial cross section according to II-II, facing upwards, through a solid body rotation stage of the separation device in FIGS. 1.

The portion of the interior cylindrical tube 24 situated between the lower radial wall 17 and the intermediate radial wall 27 exhibits radial inlet orifices 29 distributed in an angular manner and situated close to the axis of rotation 12. The intermediate radial wall 27 exhibits a plurality of communicating longitudinal through passageways 30, which are distributed, for example, over the whole of the surface of the intermediate radial wall 27 (FIGS. 2 and 3).

Figure 3:
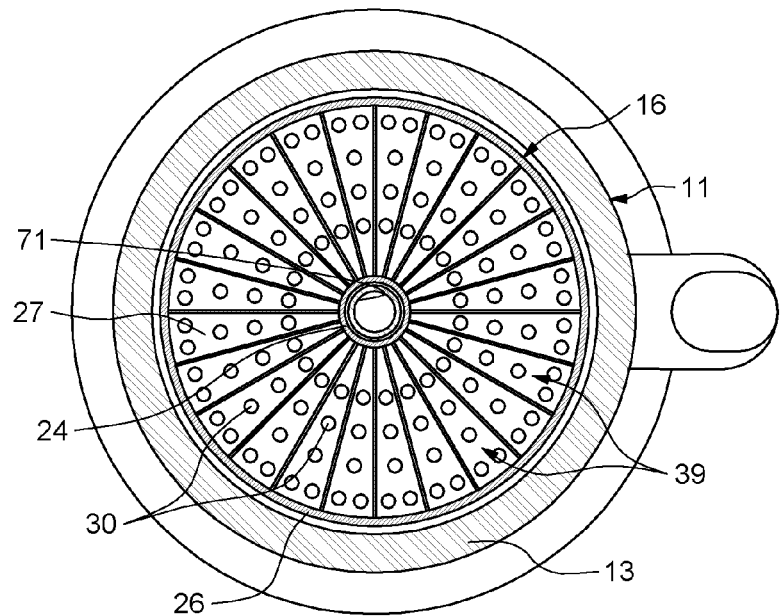
FIG. 3 represents a radial cross section according to III-III, facing downwards, through a migration and coalescence stage of the separation device in FIG. 1.

Arranged inside the inlet chamber 28 is a system of partitioning comprising a plurality of longitudinal interior partitions 31, intended to provide circumferential solid body rotation, extending in planes containing the axis 12 and distributed in an angular manner (FIG. 3). These longitudinal partitions 31 extend radially from the cylindrical peripheral wall 26 until a small distance from the interior cylindrical tube 24 and between them define a plurality of longitudinal flow spaces or channels 32 that are distributed circumferentially.

In a variant embodiment, the section of the axial tube situated between the radial wall 17 and the intermediate radial wall 27 could be eliminated.

In particular in the above-mentioned case, the interior partitioning 31 could possibly be extended as far as the axis 12 and could also be extended to the interior of the axial tube 24 and upwards beyond the intermediate radial partition 27.

A lower solid body rotation stage 33 is thus defined between the lower radial wall 17 and the interior radial wall 27 and inside the chamber 28.

The drum 16 comprises an intermediate interior radial wall 34, having an annular form, which is situated above and at a rather large distance from the intermediate radial wall 27 and below and at a distance from the radial cover 15. The intermediate radial wall and the intermediate radial wall 34 form between them a chamber 35 and form an upstream extremity and a downstream extremity of this chamber 35. The intermediate radial wall 34 extends from the cylindrical peripheral wall 26, without reaching the interior cylindrical tube 24, in such a way as to form a communicating interior longitudinal annular passageway 36 surrounding the interior cylindrical tube 24.

Figure 4:
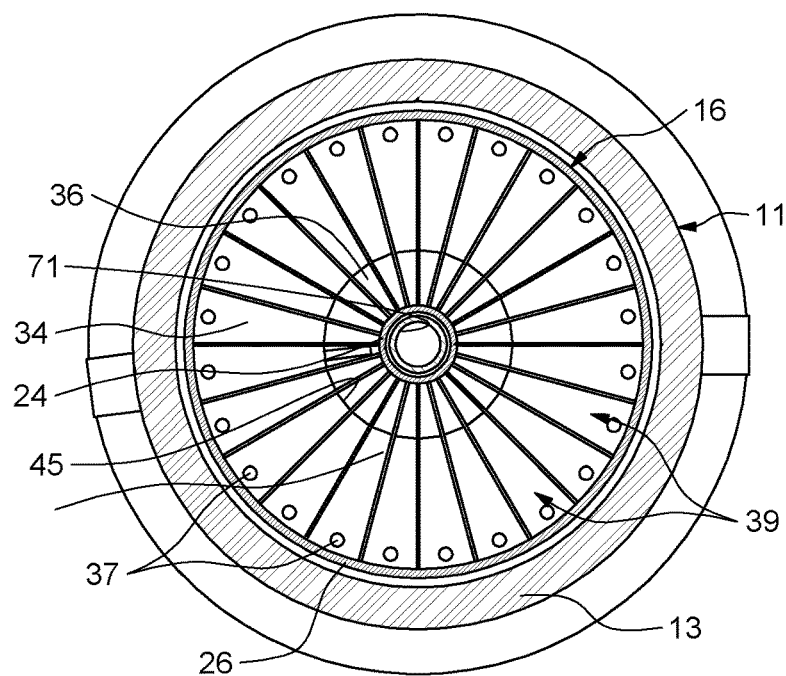
FIG. 4 represents a radial cross section according to IV-IV, facing upwards, through the migration and coalescence stage of the separation device in FIG. 1.

The intermediate radial wall 34 exhibits a plurality of exterior longitudinal through passageways 37, which are arranged at a short distance from the cylindrical peripheral wall 26 and, for example, are distributed on a circle (FIG. 4). The exterior longitudinal through passageways 37 are thus more remote from the axis of rotation 12 of the drum 16 than the interior longitudinal annular passageway 36.

Arranged inside the chamber 35 is a system of partitioning which comprises a plurality of longitudinal interior partitions 38, intended to provide circumferential solid body rotation, extending in planes containing the axis 12 and distributed in an angular manner (FIGS. 3 and 4).

These longitudinal partitions 38 extend radially between and are attached to the interior cylindrical tube 24 and the cylindrical peripheral wall 26 and extend longitudinally between and are attached to the intermediate radial wall 27 and the intermediate radial wall 34. These longitudinal partitions 38 define between them a plurality of longitudinal flow channels 39.

These longitudinal channels 39 exhibit one upstream extremity adjoining the intermediate radial wall 27 and one downstream extremity adjoining the intermediate radial wall 34 and are distributed circumferentially. The number of longitudinal partitions 38 may be equal to the number of longitudinal partitions 31. The longitudinal partitions 38 may be arranged in the extension of the longitudinal partitions 31.

An intermediate migration and coalescence stage 40 is thus defined between the intermediate radial wall 27 and the intermediate radial wall 34 and inside the chamber 35.

An upper extraction stage 41 situated above the migration and coalescence stage 40 is defined between the intermediate radial wall 34 and the upper radial cover 15.

Figure 6:
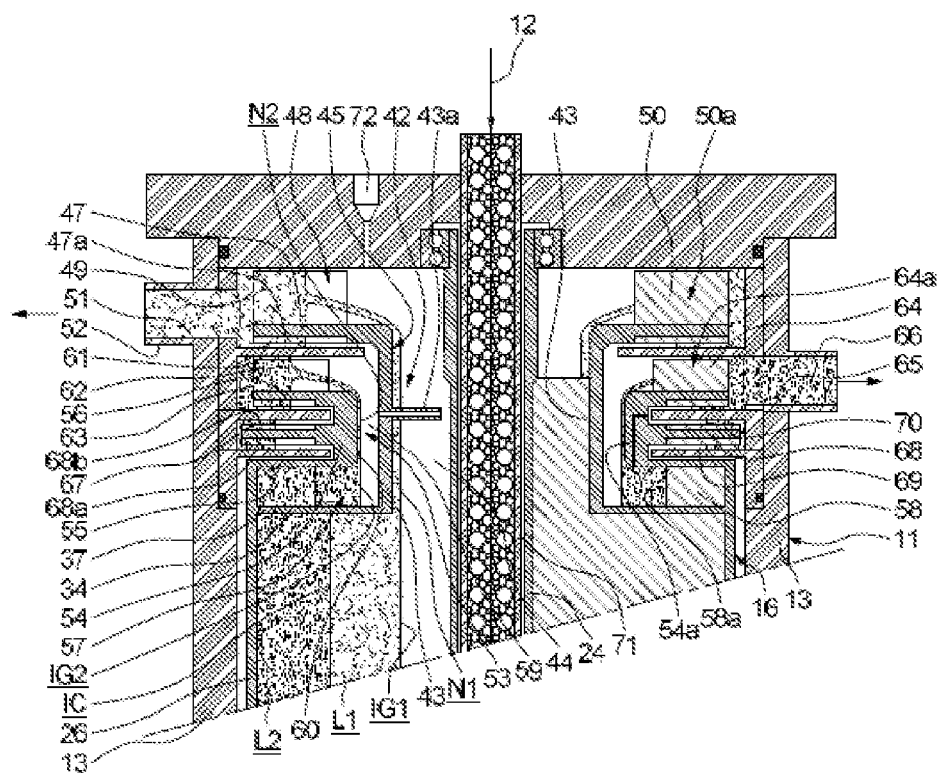
FIG. 6 represents an enlarged vertical cross section through the upper section of the separation device in FIG. 1, including the extraction stage.

As illustrated more particularly in FIG. 6, this extraction stage 41 comprises an interior overflow 42, which comprises a longitudinal cylindrical wall 43, of which the lower extremity is connected to the interior annular edge of the intermediate radial wall 34, and which extends upwards as far as a distance from the radial cover 15.

A longitudinal annular flow space 44 is thus defined between the longitudinal cylindrical tube 24 and the longitudinal cylindrical wall 43, which communicates with the chamber 35 through the longitudinal annular passageway 36.

The interior face of the cylindrical wall 43 thus forms an annular overflow edge 45 turned facing towards the axis of rotation 12 and extending along the longitudinal flow space 44.

Arranged in an optimal manner inside the longitudinal annular flow space 44 is a plurality of longitudinal partitions 46, intended to provide circumferential solid body rotation, which extend in planes containing the axis 12, between the longitudinal tube 24 and the longitudinal wall 43, and which are distributed in an angular manner. These longitudinal partitions 46 provide an upward extension for the longitudinal partitions 38 of the migration and coalescence stage 40 by passing through the longitudinal passageway 36.

The interior overflow 42 additionally comprises a radial wall 47, of annular form, of which the interior edge is connected to the upper edge of the cylindrical wall 43, and of which the exterior edge is situated at a short distance from the cylindrical peripheral wall 26, in such a way as to define a downstream peripheral discharge space 48 between the radial cover 15 and the radial wall 47. This downstream discharge space 48 communicates internally with the longitudinal annular flow space 44 and is open radially towards the cylindrical peripheral wall 26 in such a way as to form an annular downstream outlet 49.

Arranged inside the downstream discharge space 48 are a plurality of longitudinal vanes 50, intended to provide circumferential solid body rotation, which are arranged in planes containing the axis of rotation 12 and are distributed in an angular manner, and which are supported laterally by the radial wall 47 and extend upwards until they are close to the cover 15. A self-adjusting downstream centrifugal pump 50a integrated with the drum is formed in this way.

The cylindrical peripheral wall 13 of the fixed support exhibits a through discharge orifice 51 situated opposite the downstream discharge space 47 and extended by an exterior discharge pipe 52. A number of discharge orifices 51 distributed around the cylindrical peripheral wall 13 could be provided.

The extraction stage 41 likewise comprises an exterior overflow 53 which is formed between the radial walls 34 and 47 and around and at a distance from the cylindrical wall 43.

The exterior overflow 53 comprises a longitudinal cylindrical wall 54 situated around and at a distance from the cylindrical wall 43, of which the lower edge is at a distance above the intermediate radial wall 34, and of which the upper wall is at a distance below the radial wall 47.

The exterior overflow 53 additionally comprises a radial wall 55, of annular form, which is situated at a distance above the intermediate radial wall 34, and which connects the upper edge of the cylindrical peripheral wall 26 and the lower edge of the cylindrical wall 54, as well as a radial wall 56, of annular form, which is situated at a distance below the radial wall 47, of which the interior edge is connected to the upper edge of the cylindrical wall 54, and of which the exterior edge is situated at a small distance from the cylindrical peripheral wall 13 of the support 11.

An intermediate flow space 57, of annular form, is thus defined between the radial walls 34 and 55 and in the interior of the section of the upper extremity of the cylindrical peripheral wall 26, said intermediate flow space 57 communicating with the chamber 35 by means of exterior longitudinal through passageways 37 of the radial wall 34.

Figure 5:
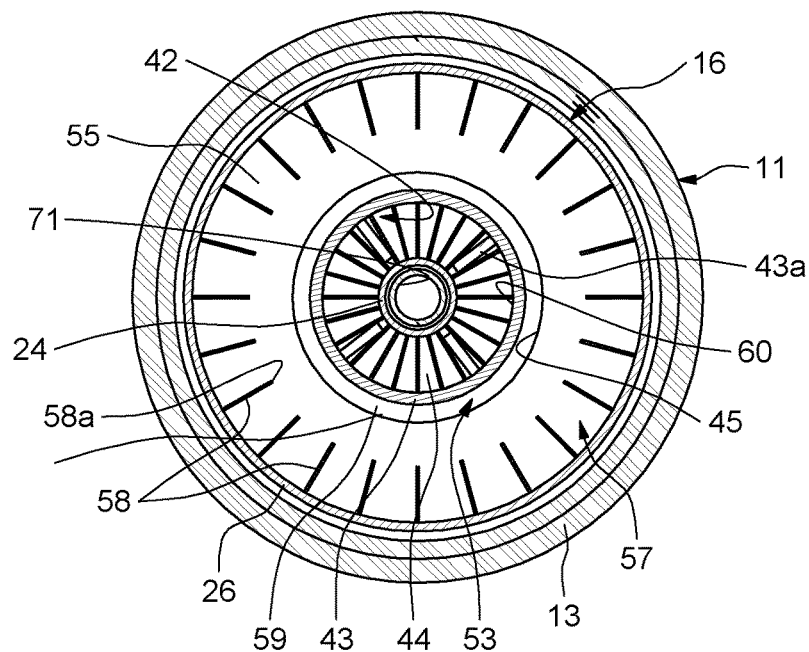
FIG. 5 represents a radial cross section according to IV-IV, facing upwards, through an extraction stage of the separation device in FIG. 1.

Arranged inside the intermediate flow space 57 are a plurality of longitudinal vanes 58 arranged in planes containing the axis of rotation 12 and distributed in an angular manner or circumferentially, said longitudinal vanes 58 being connected to the cylindrical peripheral wall 26 and to the radial walls 34 and 35 (FIG. 5). The number of longitudinal vanes may be equal to the number of longitudinal partitions 38. The longitudinal vanes 58 may be arranged in the extension of the longitudinal partitions 38.

Figure 7:
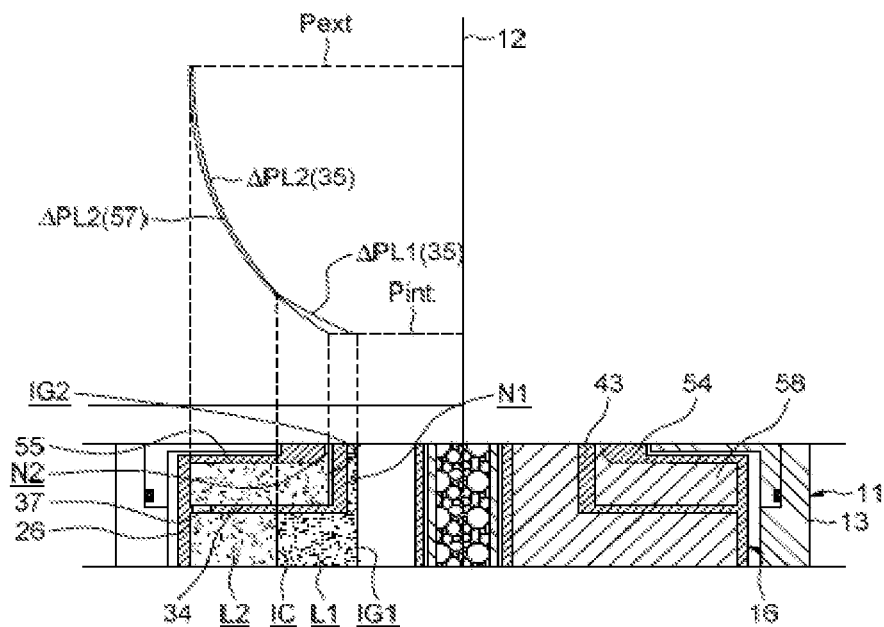
FIG. 7 illustrates pressure curves in the device depicted in FIG. 1.
Figure 8:
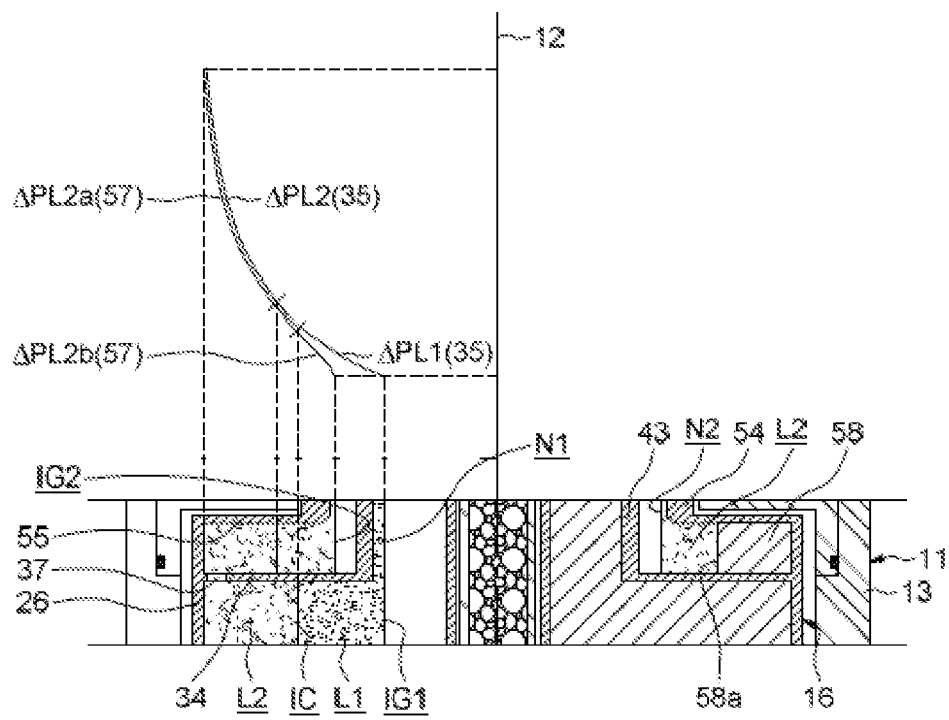
FIG. 8 illustrates other pressure curves in the device depicted in FIG. 1.

According to the variant embodiment illustrated in FIGS. 1 and 8, the longitudinal interior edges 58a of the longitudinal vanes 58 are situated at a distance from the exterior of the interior face of the cylindrical wall 54. According to another variant embodiment illustrated in FIG. 7, the longitudinal vanes 58 are extended as far as the longitudinal wall 43.

A longitudinal flow space 59, of angular form, is likewise defined between the cylindrical wall 43 and the cylindrical wall 54, which communicates with the intermediate flow space 57. The interior face of the cylindrical wall 54 forms an annular overflow edge 60 turned facing towards the axis of rotation 12 and extending along the longitudinal flow space 59.

The cylindrical peripheral wall 13 of the fixed support supports an interior radial wall 61, of annular form, situated at a small distance below the radial wall 47 and at a distance from the radial wall 56 and extending until it is close to the cylindrical wall 43. The radial wall 47 is provided, facing towards the radial wall 61, with circumferentially driving radial vanes 47a in order to form a rotating fluid seal. According to one variant embodiment, a lining forming a mechanical seal could be positioned between the rotating radial wall 47 and the fixed radial wall 61. A downstream peripheral discharge space 62, of annular form, is likewise defined between the radial wall 56 and the radial wall 61. This downstream discharge space 62 communicates with the longitudinal flow space 59 and is open radially towards the cylindrical peripheral wall 26 in such a way as to form a downstream outlet 63, of annular form.

Arranged inside the downstream discharge space 62 are a plurality of longitudinal vanes 64, intended to provide circumferential solid body rotation, which extend in planes containing the axis of rotation 12, which are distributed in an angular manner and which are supported laterally by the radial wall 56. A self-adjusting and integrated downstream centrifugal pump 64a is formed in this way.

The cylindrical peripheral wall 13 of the fixed support exhibits a through discharge orifice 65 situated opposite the downstream discharge space 62 and extended by an exterior discharge pipe 66. A number of discharge orifices 51 distributed around the cylindrical peripheral wall 13 could be provided.

The cylindrical wall 43 supports, radially, communicating radial tubes or pipes 43a, projecting into the longitudinal flow space 44, in such a way as to bring this longitudinal flow space 44 and the longitudinal flow space 59 into communication.

It follows from the above, radially, that the exterior longitudinal passageways 37 are more remote from the axis of rotation 12 than the interior longitudinal passageway 36, that the overflow edge 60 of the exterior overflow 53 is more remote from the axis of rotation 12 than the overflow edge 45 of the interior overflow 42, and that the overflow edge 60 of the exterior overflow 53 is situated between the through passageways 37 of the radial wall 34 and the overflow edge 45 of the interior overflow 42.

Arranged inside the space between the radial walls 55 and 56, the longitudinal wall 54 of the drum 16 and the cylindrical peripheral wall 13 of the fixed support 11 is a rotating fluid seal 67. This seal 67 comprises a central radial wall 68 supported by the longitudinal wall 54 and extending until it is close to the cylindrical peripheral wall 13 and the radial walls 69 and 70 supported by the cylindrical peripheral wall 13, arranged between and close to the radial walls 55 and and the radial walls 56 and 68 respectively. The central radial wall 68 is provided on its opposing faces with radial vanes 68a and 68b intended to provide a circumferential drive. The longitudinal wall 54 exhibits at least one through orifice 54a, of small diameter, bringing the intermediate flow space 57 and the internal space of the fluid seal 67 into communication. According to a variant embodiment, the integral rotating fluid seal 67 could be replaced by linings forming mechanical seals.

The fixed support 11 is equipped with an axial cylindrical delivery pipe 71 passing through the cover 15, which extends inside the interior of the cylindrical tube 24, and of which the lower extremity is at a distance from the lower radial wall 17 of the drum 16 and is situated inside the zone of the intermediate radial wall 27.

According to one variant embodiment, the axial pipe 71 could be shortened or eliminated, and a fixed inlet chamber communicating with the upper extremity of the axial pipe 71, shortened as appropriate, or of the axial tube 24, could be arranged below the fixed radial wall 15. This fixed inlet chamber could be supplied tangentially in order to bring about a rotation of the emulsion in the interior of the axial tube 24 in the direction of rotation of the drum, and having the ability to persist as far as the solid body rotation stage 33.

According to another variant embodiment, the supply could be provided axially through the radial wall 17 and the axial shaft 18, the axial tube 24 in this case being obstructed in the zone of the intermediate radial wall 27.

The cover 15 of the support 11 exhibits, in its central section, at least one through orifice 72 which communicates with the connecting space between the longitudinal flow space 44 and the downstream discharge space 48 of the interior overflow 42.

The separation device 10 may function in the following manner.

The drum 16 is caused to rotate by the motor 20 and turns at a substantially constant appropriate speed.

An emulsion E containing a light liquid L1 and a heavy liquid L2, to be separated from one another, enters the fixed supply pipe 71 and is introduced, through radial inlet orifices 29 in the rotating tube 24, into the flow spaces 32 of the chamber 28 of the solid body rotation stage 33, inside which it is caused to rotate as a solid body under the effect of the longitudinal vanes 31.

The emulsion E then passes through the longitudinal through passageways 30 of the intermediate radial wall 27 and enters into the longitudinal flow channels 39 of the chamber 35 of the migration and coalescence stage 40, in which the rotation as a solid body is maintained under the effect of the longitudinal vanes 38 as far as the intermediate radial wall 34 of the downstream extremity of the chamber 35.

As the longitudinal flow takes place, from upstream to downstream, under the effect of the centrifugal force resulting from the rotation of the drum 16, and in each of the longitudinal flow channels 39, the light liquid L1 has a tendency to be displaced towards the axis of rotation 12, and the heavy liquid L2 has a tendency to be displaced towards the peripheral wall 26, in such a way that the liquids L1 and L2 are separated before reaching the intermediate radial wall 34 of the downstream extremity of the migration and coalescence stage 40.

The result is that, at least in the terminal section of the chamber 35, the light liquid L1 forms an interior cylinder exhibiting a substantially cylindrical free surface IG1 turned facing towards the axis of rotation and situated at a distance from the longitudinal tube 24, and that the heavy liquid L2 forms an exterior cylinder in contact with the cylindrical peripheral wall 26, said interior and exterior cylinders of liquids L1 and L2 exhibiting a cylindrical interface IC which is situated between the interior longitudinal passageway 36 and the exterior through passageways 37 of the intermediate radial wall 34. The extremities of the connecting tubes 43a are in the interior of the cylindrical free surface IG1.

The light liquid L1 then passes through the interior longitudinal passageway 36 of the intermediate radial wall 34 and then flows longitudinally inside the longitudinal flow space 44 on the overflow edge 45 of the interior overflow 42 in the form of a cylindrical sheet N1, of which the surface is in the extension of the cylindrical free surface IG1. The solid body rotation can be maintained thanks to the longitudinal partitions 46.

The light liquid L1 then flows, radially towards the exterior, into the downstream discharge space 48, continues to flow through the downstream outlet 49 of the drum 16, then continues to flow through the outlet orifice 51 of the fixed support 11, and finally flows into the discharge pipe 52.

Under certain conditions, the liquid L1 may form an annular layer in the periphery of the downstream flow space 48 and on the corresponding peripheral zone of the peripheral wall 13 of the support 11.

In parallel, the heavy liquid L2 passes through the exterior longitudinal passageways 37 of the partition 34 and enters the intermediate flow space 57. The heavy liquid L2 then flows radially towards the interior inside the intermediate flow space 57, inside which the solid body rotation is maintained thanks to the longitudinal vanes 58, at least in the periphery of this flow space 57. The heavy liquid L2 then flows longitudinally inside the longitudinal flow space 59 on the overflow edge 60 of the exterior overflow 53 in the form of a cylindrical sheet N2 exhibiting a cylindrical free surface IG2 formed at a distance from the exterior face of the longitudinal wall 43. The pressure on the free surfaces IG1 and IG2 is the same because of the existence of the radial pipes 43a.

The heavy liquid L2 then overflows, radially towards the exterior, into the downstream discharge space 62, continues to flow through the downstream outlet 63 of the drum 16, then continues to flow through the outlet orifice 65 of the fixed support 11, and finally flows into the discharge pipe 66. Under certain conditions, the liquid L2 may form an annular layer in the periphery of the downstream flow space 62 and on the corresponding peripheral zone of the peripheral wall 13 of the support 11.

The radial thicknesses of the sheets N1 and N2 of liquids L1 and L2 on the overflow edges 45 and 60 depend in particular on the speed of rotation of the drum 16, on the rate of flow of treated emulsion, on the respective proportions of the liquids L1 and L2 in the emulsion E, and on the respective radial positions of the overflow edges 45 and 60. The thicknesses of the sheets N1 and N2 are small in proportion to the various other thicknesses of the liquids L1 and L2.

In the event of the separation of the emulsion E leading to the production of a gaseous phase in the interior of the free cylindrical surfaces IG1 and IG2, this gaseous phase is discharged via the orifice 72 of the upper cover 15.

The flows that have been described above may be achieved to the extent that the longitudinal spaces 44 and 59 are not congested, and to the extent that the interface IC is established in an intermediate radial position between the interior longitudinal passageway 36 and the exterior longitudinal passageways 37 of the intermediate radial wall 34, in such a way that only the light liquid L1 exits via the interior longitudinal passageway 36, and that only the heavy liquid L2 exits via the exterior longitudinal passageways 37.

For a given radial position of the overflow edges 45 and 60, and on the assumption that the gases below the free surfaces IG1 and IG2 are at the same pressure because of the existence of the connecting pipes 43a, the radial position of the interface IC between the light liquid L1 and the heavy liquid L2 depends in principle on the difference between the densities of the liquids L1 and L2 and on the speed of rotation of the drum 16, in particular for the following reasons.

In the migration and coalescence chamber 35, the presence of the longitudinal circumferentially driving vanes 38, which hold circumferential portions between them, on limited angular sectors, of the emulsion E and then of the light liquid L1 and the heavy liquid L2, at least in the terminal section of the chamber 35, imposes a radial development of the circumferential speeds of the solid body type, that is to say the circumferential speeds of the emulsion E and then of the liquids L1 and L2 develop proportionally to the radius.

In the intermediate flow space 57, the presence of the longitudinal circumferentially driving vanes 58, which hold circumferential portions of the heavy liquid L2 between them, imposes a radial development of the tangential speeds of the liquid L2 of the solid body type, that is to say the circumferential speeds of the liquid L2 develop proportionally to the radius.

In the event that the circumferentially driving vanes 58 extend towards the interior, at least as far as the exterior overflow edge 60, the solid body rotation is maintained inside the intermediate flow space 57 as far as this overflow edge 60.

In the event that the longitudinal interior edges 58a of the longitudinal circumferentially driving vanes 58 are situated at a distance from the exterior of the exterior overflow edge 60, the solid body rotation is maintained inside the intermediate flow space 57 as far as these longitudinal interior edges 58a. Once past these edges 58a, the flow of the liquid L2 has a tendency to become cyclonic, the circumferential speeds of the liquid L2 having a tendency to become inversely proportional to the radius.

A description will now be given of the pressure conditions in the liquids L1 and L2 to either side of the radial wall 34, on the one hand in the downstream section of the chamber 35 of the migration and coalescence stage 40, and on the other hand inside the intermediate space 57.

Illustrated in FIG. 7 is the case in which the circumferentially driving vanes 58 inside the intermediate flow space 57 extend towards the interior at least as far as the exterior overflow edge 60.

On the peripheral wall 26, the pressures $P_{ext}$ of the liquid L2 are substantially equal to either side of the radial wall 34, inside the chamber 35 and inside the intermediate space 57, which are connected by the through passageways for communication 37.

The pressures $P_{int}$ are substantially equal on the substantially cylindrical interior free surface IG1 of the liquid L1, inside the chamber 35 and inside the longitudinal space 44, and on the substantially cylindrical interior free surface IG2 of the liquid L2, at the location of the communication space 57 and inside the longitudinal space 59.

The pressure reduces according to two successive curves inside the chamber 35 and radially from the exterior towards the interior. Between the peripheral wall 26 and the interface IC, the pressure in the heavy liquid L2 decreases from the pressure $P_{ext}$, according to a pressure curve $\Delta PL2(35)$. Then, between the interface IC and and the free surface IG1, the pressure in the light liquid L1 decreases to the pressure $P_{int}$, according to a pressure curve $\Delta PL1(35)$.

Inside the intermediate space 57 and radially from the exterior towards the interior, between the peripheral wall 26 and the interior free surface IG2, the pressure in the heavy liquid L2 decreases from the pressure $P_{ext}$ to the pressure $P_{int}$, according to a pressure curve $\Delta PL2(57)$.

The pressure curves $\Delta PL2(35)$, $\Delta PL1(35)$ and $\Delta PL2(57)$ depend on the densities of the liquids L1 and L2 and are respectively formed, substantially, by portions of concave parabola facing towards the axis of rotation 12. The pressure curve $\Delta PL2(57)$ and the pressure curve $\Delta PL2(35)$ follow substantially the same curve.

Illustrated in FIG. 8 is the case in which the circumferentially driving vanes 58 do not extend towards the interior as far as the exterior overflow edge 60 and exhibit the interior edges 58a, the thicknesses of the liquids L1 and L2 inside the chamber 35 being similar.

Inside the chamber 35, the pressure conditions are similar to those of the previous example.

On the other hand, inside the intermediate space 57 and radially from the exterior towards the interior, between the peripheral wall 26 and the interior edges 58a of the circumferentially driving vanes 58, the pressure in the heavy liquid L2 decreases from the pressure $P_{ext}$, according to a curve $\Delta PL2a(57)$, as in the previous example. On the other hand, between the interior edges 58a of the circumferentially driving vanes 58 and the interior free surface IG2, the pressure in the heavy liquid L2 decreases to the pressure $P_{int}$ according to another curve $\Delta PL2b(57)$.

Given the fact that the flow tends to be cyclonic between the interior edges 58a of the circumferentially driving vanes 58 and the interior free surface IG2, as indicated previously, this decrease according to the curve $\Delta PL2b(57)$ is more rapid than the decrease identified according to the example in FIG. 7, in which the solid body rotation of the liquid L2 is maintained at least as far as the overflow edge 60. This curve $\Delta PL2b(57)$ is formed, substantially, by a portion of a convex hyperbole facing towards the axis of rotation 12.

It is for this reason, in the example illustrated in FIG. 8, having retained the radial position of the interior overflow edge 44 and the radial position of the interface IC of the example illustrated in FIG. 7, that the exterior overflow edge 60 in FIG. 8 exhibits a larger diameter than that of the overflow edge 60 in the example illustrated in FIG. 7.

The presence of the cyclonic flow according to the example in FIG. 8 permits a larger radial distance to be obtained between the overflow edges 45 and 60 than in the case illustrated in FIG. 7. The separation device 10 is thus able to separate the liquids having selected densities within a wider range, and it is then possible to separate liquids L1 and L2 having very similar densities.

According to a variant application, the emulsion E is introduced into the supply pipe 71 by means of a volumetric pump (not illustrated here), the orifice 72 of the cover 15 is at atmospheric pressure, and the need exists for the pressure loads in the outlets 51 and 65 to be greater than atmospheric pressure, for example in the event that these outlets 51 and 65 are connected to discharge pipes 52 and 66, leading to losses in load. In this case, the downstream centrifugal pumps 50a and 64a formed by the downstream vanes 50 and 64 serve the purpose of providing the rates of flow of liquids L1 and L2, which originate from the overflow edges 44 and 60 and overflow radially towards the exterior, with the pressure loads permitting these losses in load to be compensated.

According to another variant application, the orifice 72 of the cover 15 is connected to a vacuum pump in order to generate a reduced aspiration pressure, for example lower than the atmospheric pressure, permitting the aspiration of the emulsion E. The downstream centrifugal pumps 50a and 64a formed by the downstream vanes 50 and 64 serve the purpose of providing the rates of flow of liquids L1 and L2, which overflow, with the pressure loads permitting the aspiration pressure and any losses in load in the previous example to be compensated.

According to another variant application, if the interior pressure imposed through the orifice 72 is lower than the pressure in the outlets 51 and 65, for a given difference, the result is the self-regulation of the radial level of the liquids L1 and L2 in the downstream flow spaces 48 and 62, regardless of the rates of flow and regardless of the ratio between the densities of the liquids L1 and L2.

According to another variant application, the downstream flow spaces 48 and 62 are able to communicate directly with the atmosphere via through passageways 51 and 65 in the peripheral wall of the support 11, with a view to a discharge by overflowing of the liquids L1 and L2. In this case in particular, the downstream vanes 50 and 58 could be eliminated if the emulsion E is placed under pressure and if the interior pressure is equal to the atmospheric pressure.

Figure 9:
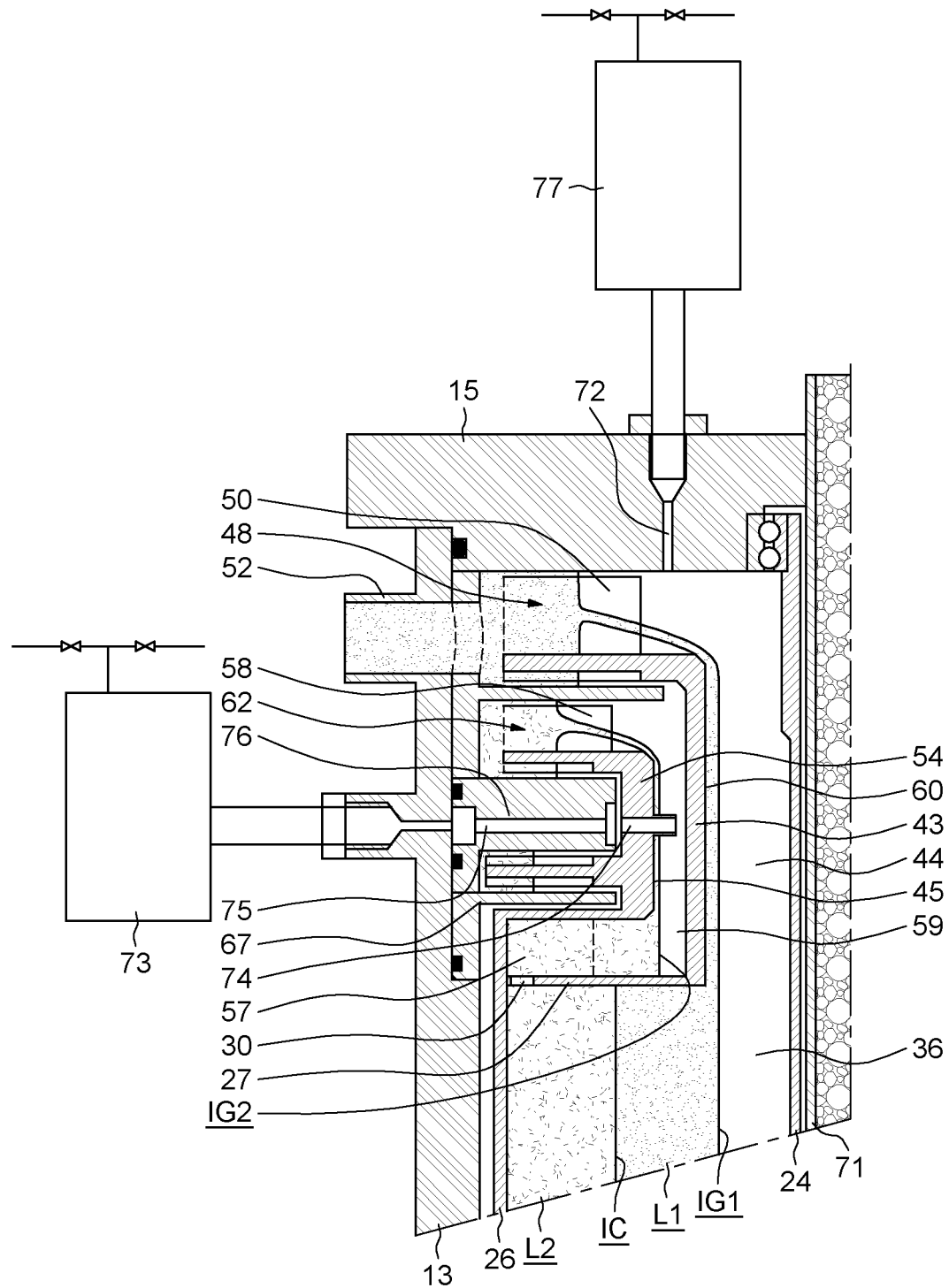
FIG. 9 represents half a vertical cross section through the upper section of a variant embodiment of the separating device depicted in FIG. 1.

According to another variant application, illustrated in FIG. 9, the connecting pipes 43a are eliminated. The flow space 59, on this occasion, is connected to a gas pressurization/depressurization source 73 by means of a radial pipe 74 passing trough the longitudinal wall 54 and by means of a radial pipe 75 passing through one interior radial wall 76, of annular form, of the support 11, arranged in the rotating fluid seal 67, whereas the orifice 72 is connected to a gas pressurization/depressurization source 77.

Thus, the pressure supplied by the source 77 acts on the free surface IG1 of the liquid L1, in the interior overflow 42, and the pressure supplied by the source 73 acts on the free surface IG2 of the liquid L2, in the exterior overflow 53.

By causing a variation in the difference between the pressurization/depressurization supplied by the sources 73 and 77, it is then possible to cause a variation in the radial position of the interface IC and to adapt it in such a way as to position the interface IC radially between the interior overflow edge 60 and the longitudinal orifices 30 in order to obtain a satisfactory separation.

The actual desired position of the interface IC may thus be adjusted or regulated as a function of the variations in the densities of the liquids L1 and L2 and/or as a function of the variations in the position of the interface IC which could be detected by a measuring apparatus.

In one particular case, one of the sources of pressurization/depressurization may be the atmospheric pressure. Only the other source of pressure is then capable of being adjusted or regulated.

As far as the rotating fluid seal 67 is concerned, its function may be as follows. Liquid L2 originating from the intermediate flow space 57 is introduced via the through orifice 54a. Under the effect of the radial vanes 68a and 68b supported by the rotating radial wall 68 facing the fixed radial walls 69 and 70, this liquid is maintained in the peripheral section of the seal, between the walls 69 and 70, which creates sealing between the downstream flow space 62 and the space, and the atmosphere, between the peripheral wall 13 of the support 11 and the peripheral wall 26 of the drum 16.

In a similar manner, under the effect of the vanes 47a supported by the rotating radial wall 47 facing the fixed radial wall 61, the liquid L1 is displaced radially towards the exterior, which creates sealing between the exterior overflow 53 and the downstream flow space 48.

Figure 10:
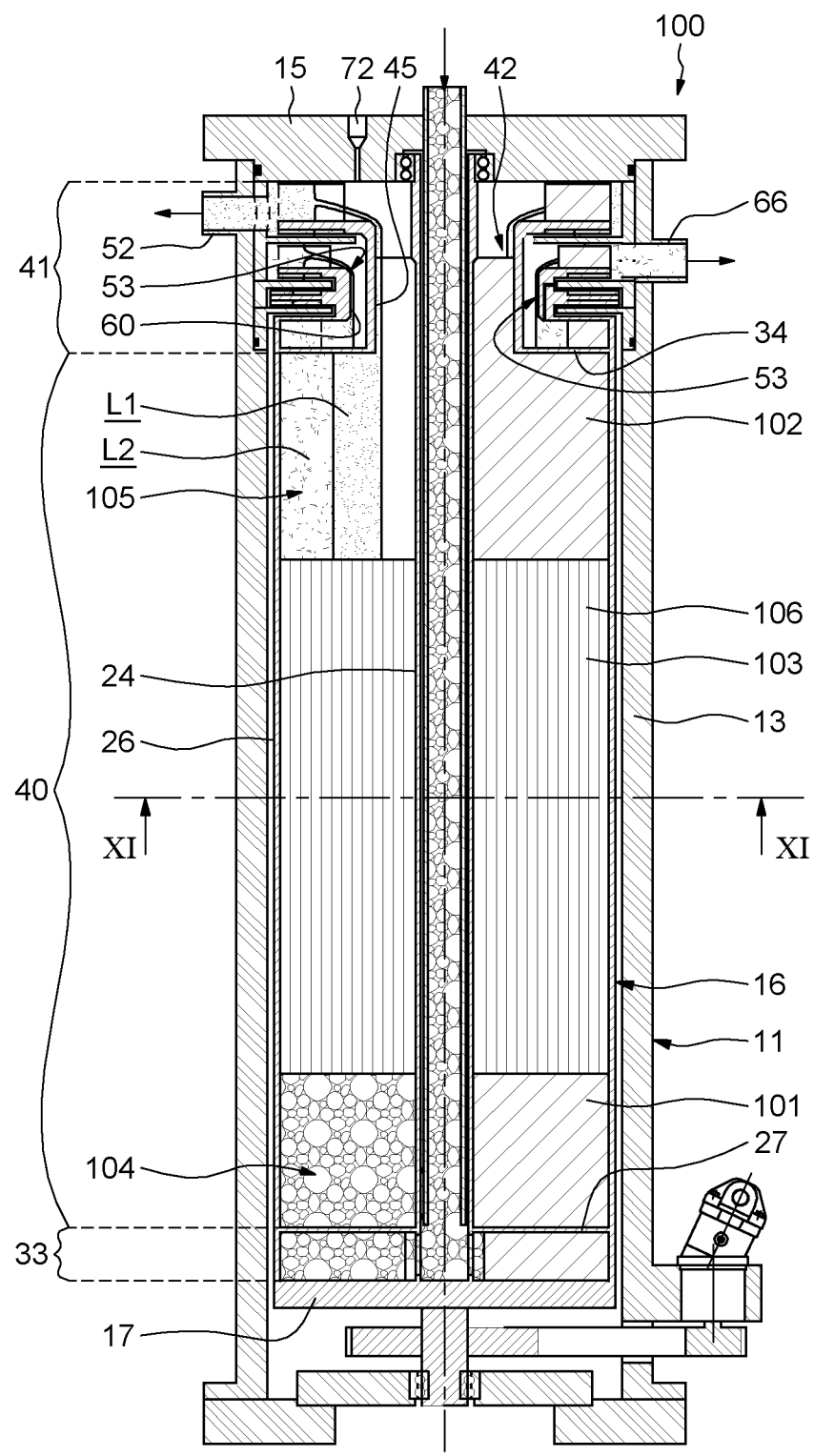
FIG. 10 represents a vertical cross section through another separating device, according to X-X in FIG. 11.
Figure 11:
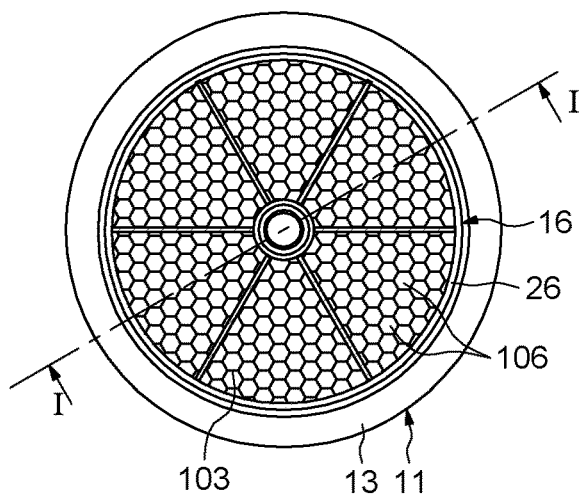
FIG. 11 represents a radial cross section according to XI-XI through a migration and coalescence stage of the separation device depicted in FIG. 10, according to a first variant embodiment.
Figure 12:
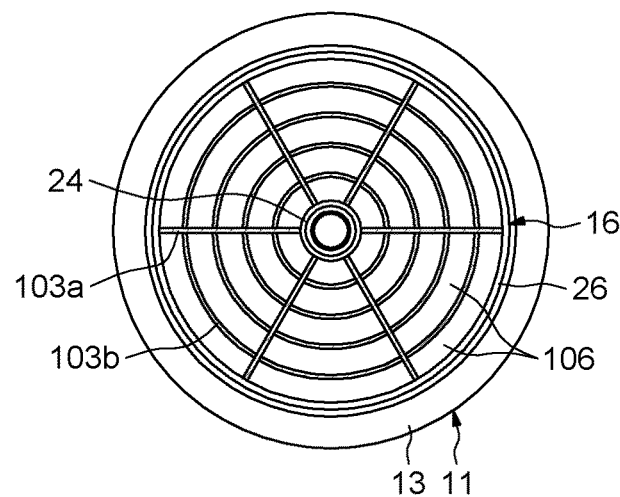
FIG. 12 represents a corresponding radial cross section through the migration and coalescence stage of the separating device depicted in FIG. 10, according to a second variant embodiment.

With reference to FIGS. 10 to 12, it can be appreciated that a separation device 100 is illustrated here which differs from the separation device 10 in respect of the structure of the system of partitioning arranged inside the chamber 35 of the migration and coalescence stage 40, the other sections being similar.

This system of partitioning comprises, in the upstream section of the chamber 35 adjacent to the intermediate radial wall 27, a plurality of longitudinal partitions 101 and, in its downstream section adjacent to the intermediate radial wall 34, a plurality of longitudinal partitions 102 and, in its median longitudinal part, a plurality of longitudinal partitions 103.

The longitudinal partitions 101 and the longitudinal partitions 102 are arranged, in a similar manner to the partitions 38 of the separation device 10, in such a way as to form pluralities of longitudinal flow channels 104 and 105 that are distributed circumferentially.

The longitudinal partitions 103 are arranged in such a way as to form a plurality of intermediate longitudinal flow channels 106 that are distributed circumferentially and radially. The longitudinal flow channels 106 thus exhibit cross sections that are smaller than the longitudinal flow channels 104 and 105 and are present in a larger number.

By way of example, the length of the longitudinal channels 104 may be equal to 15% of the length of the chamber 35, the length of the longitudinal channels 106 may be equal to 40% of the length of the chamber 35, and the length of the longitudinal channels 105 may be equal to 35% of the length of the chamber 35.

According to a variant embodiment illustrated in FIG. 11, the longitudinal partitions 103 are arranged in such a way that, in cross section, the longitudinal flow channels 106 form honeycombs.

According to another variant embodiment illustrated in FIG. 11, the longitudinal partitions 103 comprise longitudinal partitions 103a which are distributed in an angular manner, and cylindrical longitudinal partitions 103b which are arranged at a distance from one another in the radial sense.

Thanks to the existence of the upstream longitudinal partitions 101, and then the intermediate longitudinal partitions 103, and then the downstream longitudinal partitions 102, the result is the circumferential solid body rotational driving, inside the upstream longitudinal channels 104, and then inside the intermediate longitudinal channels 106, and then inside the downstream longitudinal channels 105, of the emulsion and then the liquids L1 and L2, in a similar manner to that which has been described previously in relation to the separation device 10.

Figure 13:
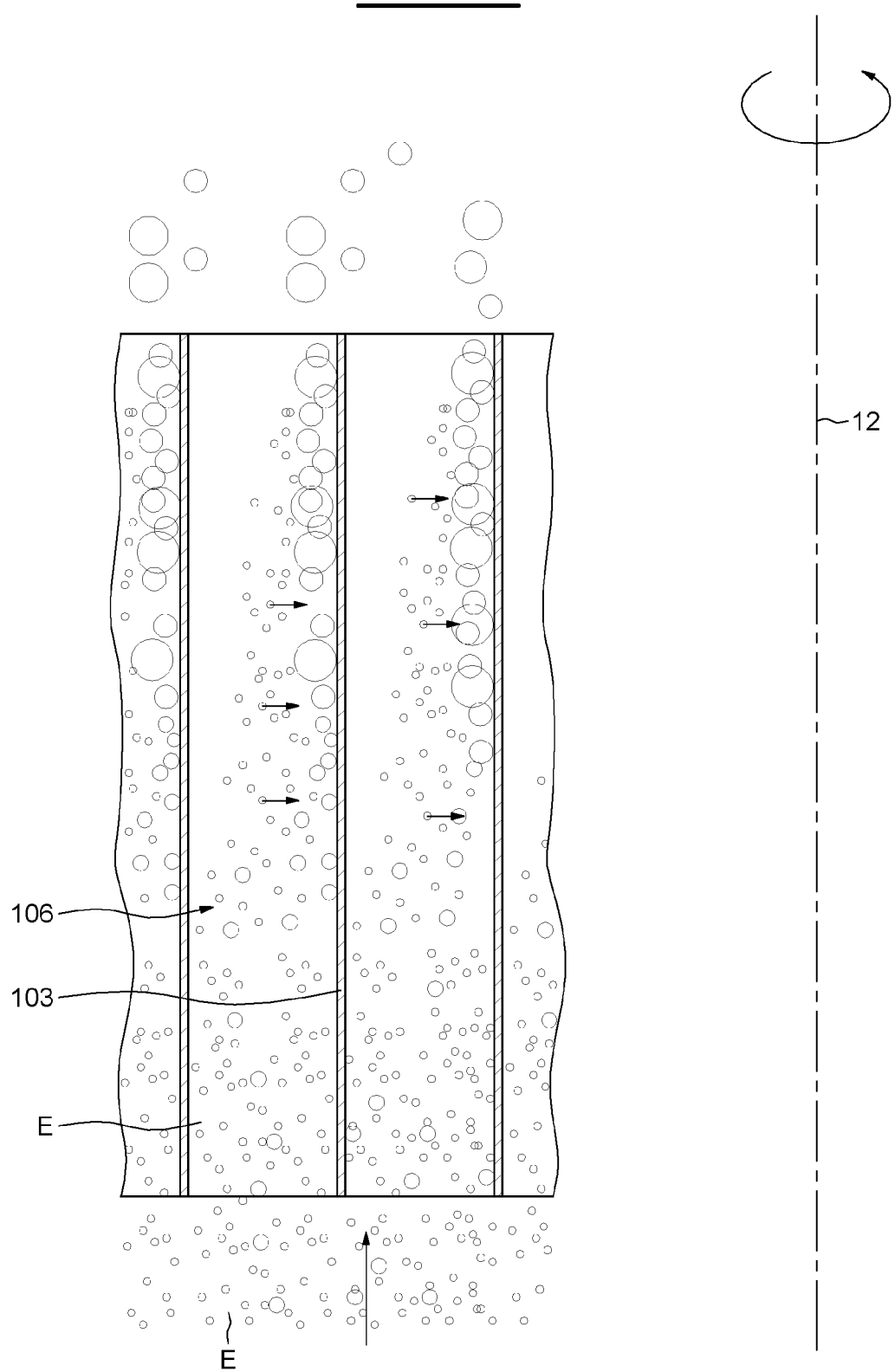
FIG. 13 represents a corresponding enlarged vertical cross section through a section of the migration and coalescence stage of the separating device depicted in FIG. 10.

On this occasion, however, as illustrated in FIG. 13, the existence of the intermediate longitudinal channels 106, in a very much greater number and distributed circumferentially and radially, makes it possible to produce a migration and coalescence of the liquids L1 and L2 in each of these intermediate longitudinal channels 106. This may lead to an improvement in the performance of the separation of the liquids L1 and L2, which may permit a reduction in the dimensions of the separation device.

Figure 14:
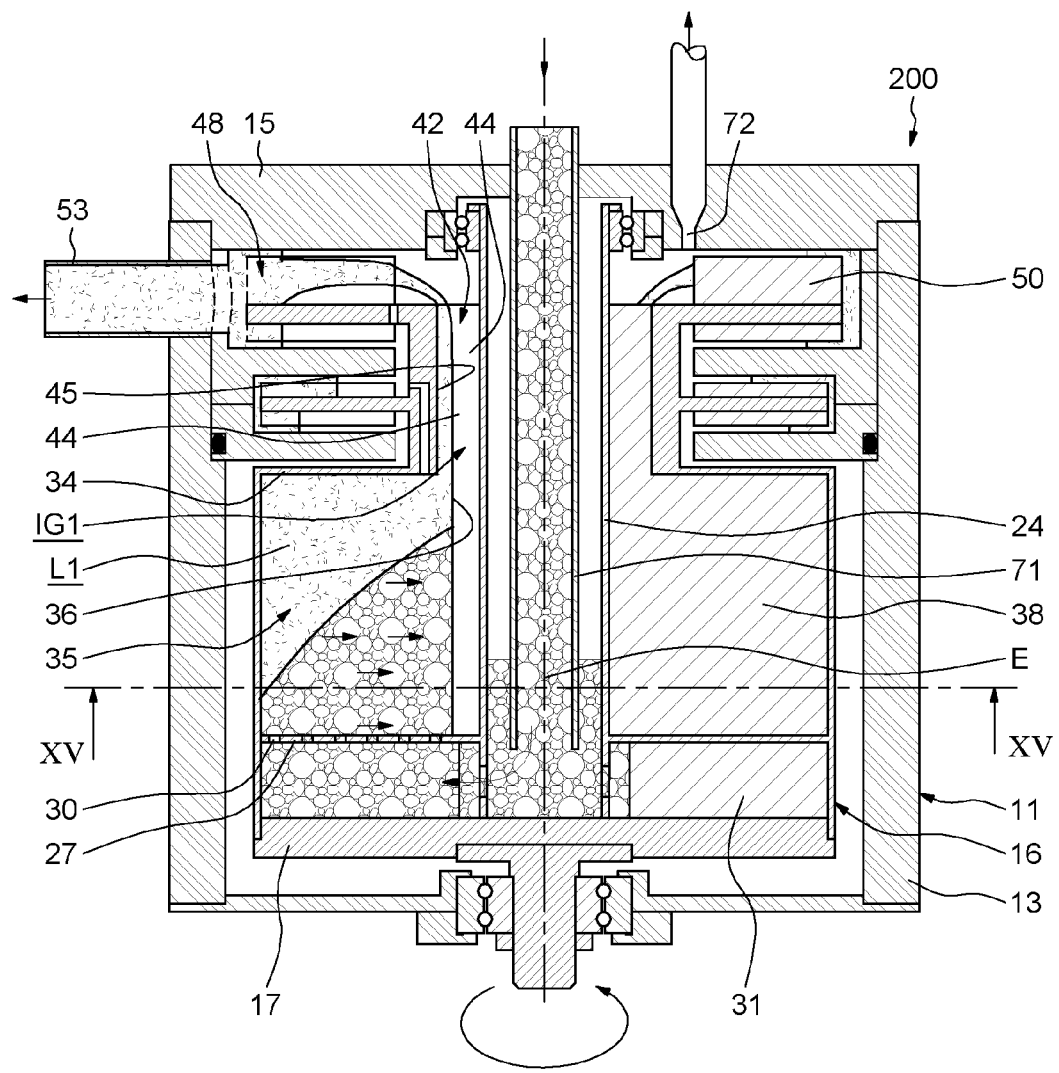
FIG. 14 represents a vertical cross section through another separating device, according to XIV-XIV in FIG. 15.
Figure 15:
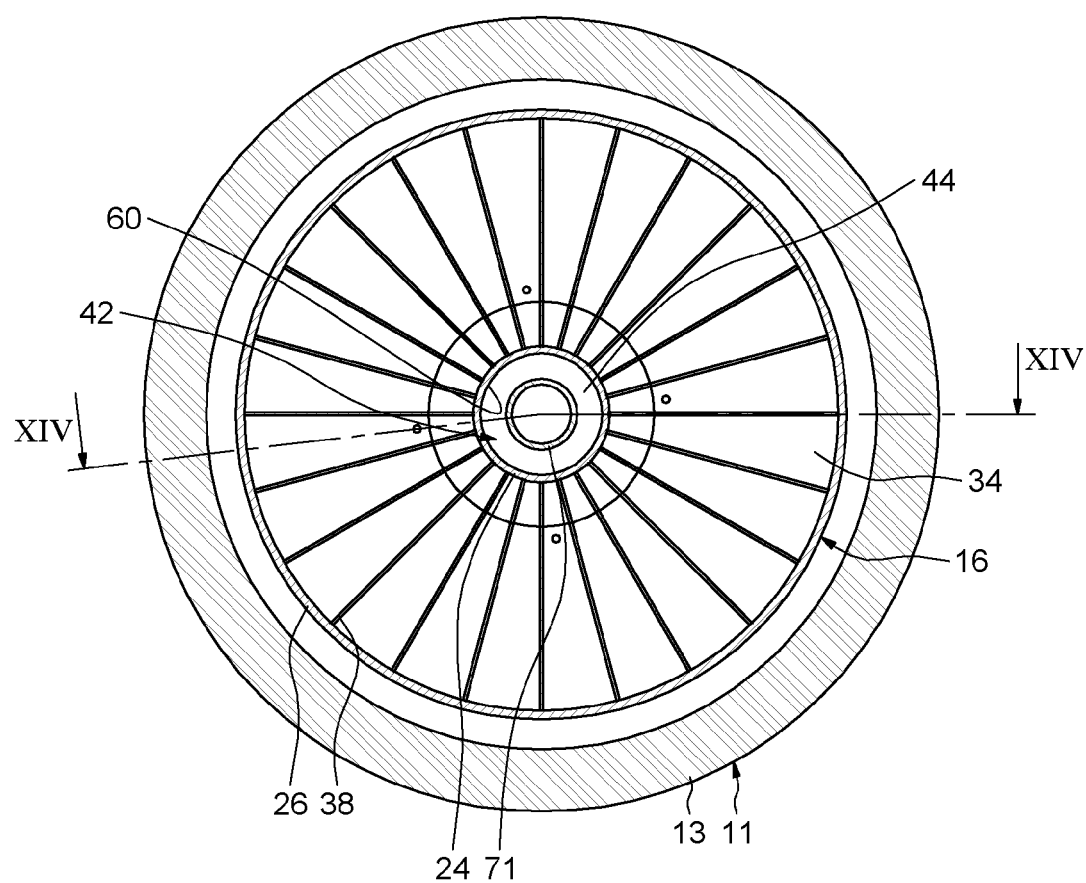
FIG. 15 represents a radial cross section according to XV-XV through a migration and coalescence stage of the separating device depicted in FIG. 10, according to a first variant embodiment.

With reference to FIGS. 14 to 15, it can be appreciated that a separation device 200 is illustrated here which differs from the separation device 10 in respect of the fact that the exterior overflow 53 is eliminated and that the intermediate partition 34 no longer exhibits the through passageways 37, the other sections being similar.

This separation device 200 is more particularly suitable for extracting from an emulsion E a free gas that is conveyed by a liquid L1 in the form of bubbles.

In a similar manner to that which has been described previously, the liquid L1, after having been introduced into the chamber 35, is subjected to being driven in a solid body rotation under the effect of the rotation of the drum 16, exhibits a cylindrical free surface IG1, passes over the overflow edge 45 of the interior overflow 42, and then overflows into the downstream flow space 48 before being discharged. The gas that has been extracted from the liquid L1 and is present inside the space between the cylindrical tube 24 and the free cylindrical surface IG1 is discharged via a plurality of orifices 72 arranged in the cover 15.

The separators described above could be arranged upside down, that is to say that their separation stage could be at the bottom. Furthermore, their principal axis could be inclined or horizontal.

The present invention is not restricted to the examples described above. Other variant embodiments are possible without departing from the scope of the invention.

The invention claimed is:

1. A device for separating immiscible fluids of different densities from an emulsion containing at least one liquid, comprising:
a longitudinal rotary drum having a longitudinal axis of rotation, and the drum comprises, internally, longitudinally from upstream to downstream and between at least one upstream inlet and a plurality of downstream outlets:
a solid body rotation stage having at least one chamber, inside which is arranged at least one longitudinal inner partition for causing circumferential solid body rotation delimiting at least one flow space communicating with said at least one upstream inlet;
a migration and coalescence stage having at least one chamber, inside the at least one chamber is arranged at least one longitudinal interior partition causing circumferential solid body rotation delimiting a plurality of longitudinal flow channels each having one upstream extremity communicating with said at least one flow space of said solid body rotation stage and one downstream extremity connected to said plurality of downstream outlets, said at least one longitudinal interior partition comprising at least one longitudinal partition delimiting at least one of said plurality of longitudinal flow channels and extending as far as said one downstream extremity; and
an extraction stage comprising at least one liquid overflow comprising an overflow edge (45) of an interior overflow turned facing towards said longitudinal axis of rotation and extending along a longitudinal flow space communicating, upstream, with said plurality of longitudinal flow channels of the migration and coalescence stage via at least one longitudinal passageway, and comprising, downstream, a downstream liquid discharge space communicating with the longitudinal flow space and connected to one of said plurality of downstream outlets.

2. The device as claimed in claim 1, wherein the at least one upstream inlet discharges into a section of the at least one flow space of the solid body rotation stage situated close to the longitudinal axis of rotation.

3. The device as claimed in claim 1, further comprising an axial pipe or an axial tube that is integral with the drum for the purpose of conveying the emulsion into the central section of the at least one chamber of the solid body rotation stage.

4. The device as claimed in claim 1, wherein partitioning of the migration and coalescence stage defines, from upstream to downstream, said plurality of longitudinal flow channels that are distributed circumferentially.

5. The device as claimed in claim 1, wherein partitioning of the migration and coalescence stage further defines, from upstream to downstream, an intermediate plurality of longitudinal channels that are distributed circumferentially and radially, followed by a downstream plurality of longitudinal channels that are distributed circumferentially, of which each channel communicates with a number of the channels in the plurality of longitudinal flow channels.

6. The device as claimed in claim 1, wherein partitioning of the migration and coalescence stage further defines, from upstream to downstream, an upstream plurality of longitudinal channels that are distributed circumferentially, followed by an intermediate plurality of longitudinal channels that are distributed circumferentially and radially, of which a number of channels communicate with each channel in the upstream plurality of channels, followed by a downstream plurality of longitudinal channels that are distributed circumferentially, of which each channel communicates with a number of the channels in the plurality of longitudinal flow channels.

7. The device as claimed in claim 1, wherein the extraction stage comprises the at least one liquid overflow, the at least one liquid overflow having an overflow edge that is annular, and the downstream liquid discharge space is annular and communicating with a plurality of downstream peripheral outlets.

8. The device as claimed in claim 1, in which the extraction stage comprises the at least one liquid overflow, the at least one liquid overflow having an overflow edge close to the axis of rotation, the downstream liquid discharge space of the overflow being connected to a downstream liquid outlet of the plurality of downstream outlets and to a downstream gas outlet of the plurality of downstream outlets.

9. The device as claimed in claim 1, further comprising partitions causing circumferential rotation positioned inside the downstream liquid discharge space.

10. The device as claimed in claim 1, further comprising a plurality circumferentially driving vanes positioned inside the longitudinal flow space.

11. The device as claimed in claim 1, wherein the extraction stage comprises an interior overflow of the at least one liquid overflow for lighter liquid,
the longitudinal flow space communicates with the migration and coalescence stage via a longitudinal interior passageway,
an exterior overflow of the at least one liquid overflow for a heavier liquid, of which an angular longitudinal flow space communicates with the migration and coalescence stage via a longitudinal exterior passageway located further from said longitudinal axis of rotation than the longitudinal interior passageway,
an overflow edge (60) of the exterior overflow located further away from said longitudinal axis of rotation than the overflow edge (45) of the interior overflow,
the overflow edge (60) of the exterior overflow being situated radially between the exterior longitudinal passageway and the overflow edge of the interior overflow, and
the interior overflow and the exterior overflow being connected to the plurality of downstream outlets by a downstream discharge space which is a first downstream discharge space and a second downstream discharge space.

12. The device as claimed in claim 11, further comprising circumferentially driving vanes positioned inside an intermediate flow space connecting the exterior passageway and the exterior overflow.

13. The device as claimed in claim 12, wherein said circumferentially driving vanes exhibit an interior edge situated outside and at a distance from the overflow edge of the exterior overflow.

14. The device as claimed in claim 11, further comprising circumferentially driving vanes positioned inside the longitudinal flow space of the interior overflow.

15. The device as claimed in claim 11, further comprising circumferentially driving vanes positioned inside the downstream liquid discharge space of the interior overflow.

16. The device as claimed in claim 11, further comprising circumferentially driving vanes positioned inside a downstream discharge space of the exterior overflow.

17. The device as claimed in claim 1, comprising a support for said drum, the support having a section provided with outlet pipes, at least one of said outlet pipes communicating with the plurality of downstream outlets for liquid from said drum.

18. The device as claimed in claim 17, further comprising a rotating fluid seal formed between the drum and the support, adjoining the extraction stage, said rotating fluid seal comprising two fixed radial walls that are integral with the support and delimit a space that is open radially towards an interior and a rotating radial wall that is integral with the drum engaged at a distance between said fixed radial walls, an open space being connected to the at least one chamber of the migration and coalescence stage via a channel, the rotating radial wall being provided on both sides with circumferentially driving vanes.

19. The device as claimed in claim 1, wherein the drum is equipped with a radial interior wall separating the at least one chamber of the solid body rotation stage and the at least one chamber of the migration and coalescence stage, said radial interior wall being provided with through passageways.

20. The device as claimed in claim 1, wherein the drum is equipped with a radial interior wall separating the at least one chamber of the migration and coalescence stage and the extraction stage, said radial interior wall having at least one longitudinal communication passageway between coalescence and extraction stages.

21. The device as claimed in claim 11, further comprising a pipe connecting an internal space of the interior overflow and an internal space of an exterior overflow.

22. The device as claimed in claim 11, further comprising a pipe connecting an internal space of the interior overflow to an exterior and a pipe for connecting the internal space of the exterior overflow to the exterior.

23. The device as claimed in claim 1, wherein a plurality of gas pressurization/depressurization sources are connected to flow spaces of said at least one liquid overflow of the extraction stage, in such a way that pressures act respectively on free surfaces of the liquids.

24. The device as claimed in claim 1, wherein the extraction stage is situated above the migration and coalescence stage.

25. The device as claimed in claim 1, further comprising an inlet chamber connected axially to a central section of the chamber of the solid body rotation stage, said inlet chamber being supplied tangentially in a direction of rotation of said drum in order to bring about a rotation of the emulsion as far as the solid body rotation stage.

26. A device for separating immiscible fluids of different densities from an emulsion containing at least two liquids, comprising a longitudinal rotary drum having a longitudinal axis of rotation, and in which the drum comprises, longitudinally from upstream to downstream and between at least one upstream inlet and a plurality of downstream outlets:
a migration and coalescence stage for the at least two liquids, in which separated liquids have a longitudinal interface; and
an extraction stage comprising
one interior overflow for lighter liquid of the at least two liquids, the one interior overflow having an overflow edge turned facing towards said longitudinal axis of rotation of said drum and extending along a longitudinal flow space communicating with the migration and coalescence stage via an interior longitudinal passageway and communicating with one of said plurality of downstream outlets of the drum, whereby a sheet of the lighter liquid can be formed on the overflow edge of the interior overflow, this sheet of the lighter liquid having a free surface, and one external overflow for a heavier liquid of the at least two liquids, the external overflow having an overflow edge turned facing towards said longitudinal axis of rotation of said drum and extending along said longitudinal flow space communicating with the migration and coalescence stage via an exterior longitudinal passageway situated further away from said longitudinal axis of rotation than the interior longitudinal passageway and communicating with another downstream outlet of said plurality of downstream outlets of the drum, whereby a sheet of the heavier liquid can be formed on the overflow edge of the interior overflow, this sheet having a free surface, and a plurality of gas pressurization/depressurization sources to flow spaces of a plurality of overflows of the extraction stage, whereby an adjustment or regulation of a gas pressure supplied by at least one of the plurality of gas pressurization/depressurization sources, with respect to the gas pressure supplied by an other of the plurality of gas pressurization/depressurization sources, acts on a free surface of the corresponding liquid and permits an adjustment or regulation of a radial position of an interface between liquids in the migration and coalescence stage.

* * * * *